(12) United States Patent
Malchi et al.

(10) Patent No.: US 10,021,035 B1
(45) Date of Patent: *Jul. 10, 2018

(54) QUEUING METHODS AND APPARATUS IN A NETWORK DEVICE

(71) Applicant: Marvell Israel (M.I.S.L) Ltd., Yokneam (IL)

(72) Inventors: Gal Malchi, HaSolelim (IL); Dror Bromberg, Michmoret (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,007

(22) Filed: Apr. 17, 2017

Related U.S. Application Data

(63) Continuation of application No. 13/781,125, filed on Feb. 28, 2013, now Pat. No. 9,628,398.

(60) Provisional application No. 61/604,254, filed on Feb. 28, 2012.

(51) Int. Cl.
*H04L 12/861* (2013.01)
*H04L 12/865* (2013.01)
*H04L 12/863* (2013.01)
*H04L 12/883* (2013.01)
*H04L 12/851* (2013.01)
*H04W 28/06* (2009.01)
*H04L 12/801* (2013.01)

(52) U.S. Cl.
CPC .......... *H04L 47/6275* (2013.01); *H04L 47/24* (2013.01); *H04L 47/6225* (2013.01); *H04L 47/6295* (2013.01); *H04L 49/9015* (2013.01); *H04L 49/9047* (2013.01); *H04W 28/06* (2013.01); *H04L 47/10* (2013.01)

(58) Field of Classification Search
CPC ....................................... H04L 47/50–47/6295
See application file for complete search history.

(56) References Cited

U.S. PATENT DOCUMENTS

| | | | |
|---|---|---|---|
| 5,838,994 A * | 11/1998 | Valizadeh | H04Q 11/0478 370/236 |
| 5,930,193 A | 7/1999 | Achiwa et al. | |
| 7,263,065 B1 | 8/2007 | Cahn | |
| 7,830,889 B1 | 11/2010 | Lemaire et al. | |
| 7,839,864 B1 | 11/2010 | Satrawla et al. | |
| 8,743,907 B1 | 6/2014 | Kadosh et al. | |
| 9,306,876 B1 | 4/2016 | Ulman et al. | |
| 9,628,398 B1 | 4/2017 | Malchi et al. | |
| 2002/0188691 A1 | 12/2002 | Ignatius et al. | |

(Continued)

OTHER PUBLICATIONS

U.S. Appl. No. 13/666,608, Shumsky et al., "Scalable Dynamic Memory Management in a Network Device," filed Nov. 1, 2012.

*Primary Examiner* — Rina C Pancholi

(57) ABSTRACT

A plurality of physical queues, in a memory of a network device, are logically coupled to define a logical queue. Packets are received by the network device, and respective data units associated with the packets are distributed to the plurality of physical queues for storage according to a predetermined scheme i) to alternate among the plurality of physical queues, and ii) to maintain an order of data units stored in the logical queue. The data units are retrieved from the plurality of physical queues according to the predetermined scheme i) to alternate among the plurality of physical queues, and ii) to maintain the order of the data units.

28 Claims, 4 Drawing Sheets

(56) References Cited

U.S. PATENT DOCUMENTS

| | | |
|---|---|---|
| 2004/0049613 A1 | 3/2004 | Kim et al. |
| 2004/0059880 A1 | 3/2004 | Bennett |
| 2005/0201398 A1* | 9/2005 | Naik .................. H04L 47/6295 370/412 |
| 2012/0127860 A1 | 5/2012 | Arumilli et al. |
| 2012/0140633 A1 | 6/2012 | Stanwood et al. |
| 2012/0163396 A1 | 6/2012 | Cheng et al. |
| 2012/0233349 A1 | 9/2012 | Aybay |

* cited by examiner

QUEUING METHODS AND APPARATUS IN A NETWORK DEVICE

CROSS-REFERENCES TO RELATED APPLICATIONS

This application is a continuation of U.S. patent application Ser. No. 13/781,125, filed Feb. 28, 2013, entitled "Queuing Methods and Apparatus in a Network Device," which claims the benefit of U.S. Provisional Patent Application No. 61/604,254, filed Feb. 28, 2012, entitled "Fast Linked List," both of which are hereby expressly incorporated herein by reference in their entireties.

FIELD OF THE DISCLOSURE

The present disclosure relates generally to communication networks and, more particularly, to network devices such as switches, routers, and edge devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network devices, such as network switches, routers, edge devices and the like often need to enqueue data (e.g., received packets or data associated with received packets) in one or more egress queues for subsequent transmission from the network device. When packets are to be transmitted from the network device, the enqueued packets (or enqueued data associated with the packets) need to be de-queued, or read from the memory the holds the corresponding queue before the corresponding packet can be transmitted. Thus, bandwidth that a network device can support is at times limited by the rate of retrieval of packets from a memory in which the data is queued for egress from the network device.

Different levels of service may be provided based upon properties of packets. In some scenarios, a higher level of service is assigned to packets representing interactive traffic than to packets representing bulk file transfers, for example. In other scenarios, the packet processor guarantees a specified bandwidth to some types of traffic and limits the bandwidth available to other types of traffic, for example. Packets corresponding to different levels of service are typically enqueued in respective egress queues that correspond to different levels of service.

SUMMARY

In an embodiment, a method includes logically coupling a plurality of physical queues, in a memory of a network device, to define a logical queue; receiving packets at the network device; distributing respective data units associated with the packets to the plurality of physical queues for storage according to a predetermined scheme i) to alternate among the plurality of physical queues, and ii) to maintain an order of data units stored in the logical queue; and retrieving the data units from the plurality of physical queues according to the predetermined scheme i) to alternate among the plurality of physical queues, and ii) to maintain the order of the data units.

In another embodiment, an apparatus for queuing data units in a network device comprises: a memory having a plurality of physical queues; and a queue controller. The queue controller is configured to: logically couple the plurality of physical queues to define a logical queue; receive data units to be stored in the memory, the data units respectively associated with packets received by the network device; distribute the data units to the plurality of physical queues for storage according to a predetermined scheme i) to alternate among the plurality of physical queues, and ii) to maintain an order of data units stored in the logical queue; and retrieve the data units from the plurality of physical queues according to the predetermined scheme i) to alternate among the plurality of physical queues, and ii) to maintain the order of the data units.

DETAILED DESCRIPTION

Example methods and apparatus are described herein in the context of Ethernet networks. One of ordinary skill in the art will recognize, in light of the disclosure and teachings herein, that similar methods and apparatus are suitable for use in other suitable communication networks as well.

Figure 1:
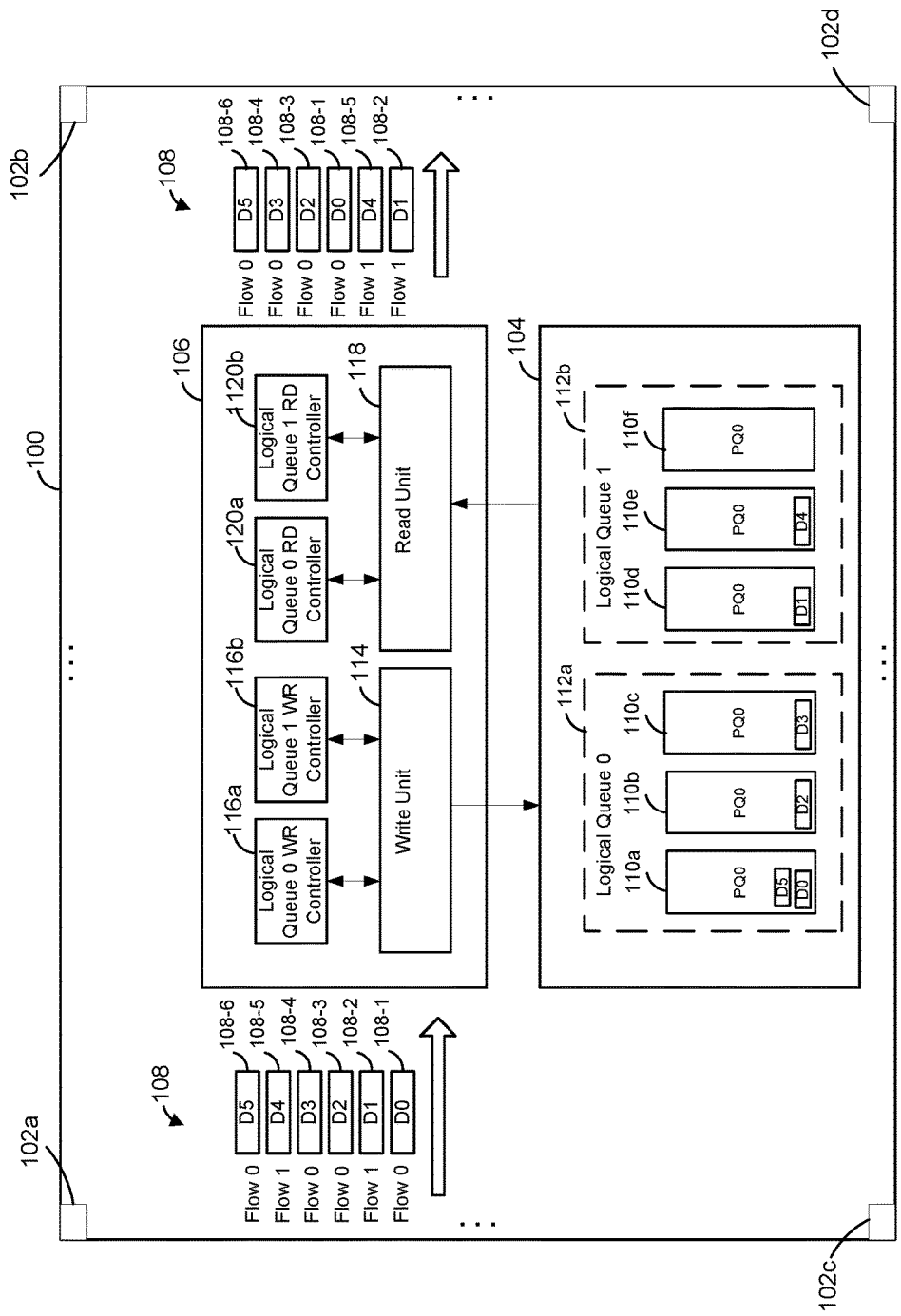
FIG. 1 is a block diagram of an example network device that utilizes egress queuing techniques described herein, according to an embodiment.

FIG. 1 is a block diagram of an example network device 100, such as a Layer-2 switch, a Layer 3 switch, a hybrid Layer2/Layer3 switch, or the like, that utilizes queuing techniques described herein, according to an embodiment. The network device 100 includes a plurality of network ports 102, and each of the network ports 102 is coupled to a respective communication link associated with a communication network. In an embodiment, the network device 100 also includes a packet processor (not shown, for clarity) coupled to the network ports 102 and configured process packets received via network ports 102. In general, the packet processor is configured to process packets received via ingress ports 102, to determine respective egress ports 102 via which the received packets should be transmitted, and to subsequently transmit the packets via the determined egress port 102. In some embodiments, the packet processor includes an ingress processing portion that generally performs ingress processing of received packets (or packet descriptors associated with the packets), and an egress processing portion that generally performs egress processing of the packets and passes the packets (or packet descriptors associated with the packets) to appropriate egress ports 102 for subsequent transmission of the packets via the egress ports 102. Upon completion of ingress processing of a packet, the packet (or a packet descriptor associated with the packet) is passed to the egress processing portion, in an embodiment. The egress portion processes the packet (or descriptor) and places the packet (or descriptor) in one or more egress queues associated with the determined egress ports 102, in an embodiment.

According to an embodiment, a descriptor for a packet includes information about the packet relevant to processing of the packet by the network device 100. For example, a descriptor for a packet includes certain fields from a header of the packet and/or certain information determined for the packet by the network device 100, in some embodiments. In some embodiments, the information included in the descriptor for a packet allows a packet processor to determine a data flow (e.g., corresponding to a priority), characterized by, for example, one or more fields, such as one or more address fields, of a header of the packet, during processing of the packet by the network device 100.

With continued reference to FIG. 1, the network device 100 includes a queue memory 104 coupled to a queue controller 106. The queue memory 104 is included in or is coupled to a packet processor and is used by the packet processor to enqueue packets (or descriptors) for subsequent transmission of the packets via appropriate egress ports 102, in some embodiments. The queue memory 104 is a shared memory that includes egress queues for several or all of the egress ports 102, according to an embodiment. In another embodiment, the network device 100 includes a respective queue memory corresponding to each of the egress ports 102. In an embodiment, the queue controller 106 is configured to serve a single egress port 102, and the network device 100 includes a respective queue controller 106 coupled to the shared memory 104 and configured to control or manage egress queues for the corresponding egress ports 102.

Generally speaking, the queue controller 106 receives data units (e.g., packet descriptors) 108 to be enqueued in the memory 104 and places the received data units 108 in appropriate egress queues in the memory 104. In an embodiment, each of the data units 108 belongs to or is associated with a particular data flow, and the egress controller 106 is configured place the data units 108 in egress queues corresponding to the data flows. Each data flow corresponds, for example, to a different priority used for scheduling transmission of packets from the network device 100, in an embodiment. When packets are to be transmitted from the network device 100, the queue controller 106 retrieves the data units 108 from the egress queues in which the data units are stored, and the packets associated with the data units 108 are transmitted via the corresponding egress ports 102, in an embodiment. In some systems, therefore, port speed of the egress ports 102 is limited by the speed of retrieval of data units 108 from the egress queues in the memory 104. In such embodiments, speed of retrieval of data units 108 from egress queues in the memory 104 needs to be at least high enough to support a bandwidth required or desired for the network device 100.

In an embodiment, to allow data units 108 to be retrieved from the memory 104 more quickly, the queue controller 106 defines a plurality of physical queues 110 for each of the egress ports 102 so that data units stored in multiple physical queues 110 can be concurrently retrieved and/or processed by the queue controller 106. Further, in some embodiments, the queue controller 106 is configured to logically couple respective subsets of physical queues 110 to define respective logical queues 112 corresponding to different data flows. Thus, in such embodiments, several physical queues 110 correspond to a logical queue 112. Further, in some such embodiments, several logical queues 112 correspond to a single egress port 102 and are used to enqueue data units corresponding to respective data flows of the egress port 102. In at least some embodiments, concurrent retrieval and/or processing of data units 108 from several physical queues 110 in a logical queue effectively increases the rate of retrieval of data units 108 from a logical queue corresponding, for example, to a particular data flow.

In an embodiment, the physical queues 110 are defined as respective sequences of physically coupled memory cells in the memory 104. In another embodiment, the physical queues 110 are defined as physical linked lists in the memory 104. For example, in an embodiment, the memory 104 includes a plurality of buffers, and the buffers are allocated, as needed, for storing data units 108 in the physical queues 110. According to an embodiment, each buffer used to store a data unit 108 in a physical queue 110 also stores an indication (e.g., an address) of the next buffer in the same physical queue 110, according to an embodiment. Logical couplings of the respective sets of physical queues, in accordance with an embodiment, are defined as respective logical linked lists maintained by the queue controller 106 for the logical queues 112. In a logical linked list that defines a logical queue 112, a data unit in one physical queue 110 of the logical queue 112 is linked to a data unit in another physical queue 110 of the logical queue 112, forming a logical link between the physical queues 110 in the logical queue 112, in an embodiment.

In the example embodiment of FIG. 1, each data unit 108 received by the queue controller 106 corresponds to a particular data flow of the corresponding egress port 102. The data flow of each data unit 108 is indicated in FIG. 1 by a "Flow" number next to the data unit 108. In particular, as illustrated in FIG. 1, data units D0 (108-1), D2 (108-3), D3 (108-4) and D5 (108-6) belong to a data flow 0, and data units D1 (108-2) and D4 (108-5) belong to a data flow 1, in the illustrated embodiment. To enqueue the data units 108 in the egress queue memory 104, the queue controller 106 defines six physical queues 110, and logically couples respective subsets of the physical queues 110 to define a respective logical queue 112 for each of the data flows processed by the queue controller 106. As illustrated in FIG. 1, a first logical queue 112a is defined to include a first subset of physical queues 110 (the physical queues 110a-110c), and a second logical queue 112b is defined to include a second subset of physical queues 110 (the physical queues 110d-110f), in the illustrated embodiment. In other embodiments and/or scenarios, the queue controller 106 defines other suitable numbers of physical queues 110 and/or couples other suitable subsets of physical queues into respective physical queues 112. In the embodiment of FIG. 1, the logical queue 112a corresponds to the data flow 0 (e.g., associated with a relatively lower priority) and the logical queue 112b corresponds to the data flow 1 (e.g., associated with a relatively higher priority). Alternatively, in another embodiment, the logical queue 112a corresponds to the data flow 1 (e.g., associated with a relatively higher priority) and the logical queue 112b corresponds to the data flow 0 (e.g., associated with a relatively lower priority).

Generally speaking, in operation, the queue controller 106 receives a data unit 108 and determines a data flow corresponding of the data unit 108. Then, based on the determined data flow corresponding to the data unit 108, the queue controller 106 selects a logical queue 112 in which the data unit 108 should be stored. The queue controller 106 then selects a physical queue 110 among the physical queues 110 in the subset of the physical queues 110 that corresponds to the selected logical queue 112, and places the data unit 108 at the tail of the selected physical queue 110, in an embodiment.

The queue controller 106 includes a write unit 114 coupled to a respective logical queue write ("WR") controller 116 for each logical queue 112 and configured to control write operations in the respective logical queues 112. Similarly, the queue controller 106 includes a read unit 118 coupled to a respective logical queue read ("RD") controller 120 corresponding to each of the logical queues 112 and configured to control read operations from the respective logical queues 112. In operation, in accordance with an embodiment, the write unit 114 processes received data units 108 to determine, for each data unit 108, a data flow corresponding to the data unit 108. Based on the determined data flow for the data unit 108, the write unit 114 selects a logical queue 112 in which the data unit 108 should be stored. For example, in an embodiment, the write unit 114 selects the logical queue 112*a* for each of the data units D0 (108-1), D2 (108-3), D3 (108-4) and D5 (108-6) corresponding to the data flow 0, and selects the logical queue 112*b* for each of the data units D1 (108-2) and D4 (108-5) corresponding to the data flow 1. Then, upon selecting the appropriate logical queue for a data unit 108, the write unit 114 sends a request to the corresponding logical queue write controller 116 instructing the logical queue write controller 116 to select a physical queue 110 within the selected logical queue 112. In an embodiment, the logical queue write controller 116 selects physical queues 110 by cycling among physical the physical queues 110, selecting queues 110 in a round robin fashion for consecutively received requests from the write unit 114. Thus, for example, the logical queue write controller 116*a* selects the physical queue 110*a* for the first data unit 108 to be stored in the logical queue 112*a* (D0), selects the physical queue 110*b* for the next data unit 108 to be stored in the logical queue 112*a* (D2), and selects the physical queue 110*c* for the following data unit 108 to be stored in the logical queue 112 (D3). After selecting the physical queue 110*c*, the logical queue write controller 116*a* cycles back to the physical queue 110*a* for the next data unit 108 to be stored in the logical queue 112*a* (D5), then selects the physical queue 110*b* for the following data unit to be stored in the logical queue 112*a*, and so on, in an embodiment. Similarly, the logical queue write controller 116*b* selects the physical queue 110*d* for the first data unit 108 to be stored in the logical queue 112*b* (D1), selects the physical queue 110*e* for the second data unit 108 to be stored in the logical queue 112*b* (D4), and so on, in an embodiment. In other embodiments, the logical queue write controllers 116 select physical queues 110 for storing data units in corresponding logical queues 112 according to other suitable selection schemes.

In any event, upon selecting a physical queue 110 for storing a data unit 108, the write controller 116 provides an indication of the selected physical queue 110 to the write unit 114. The write unit 114 then stores the data unit 108 at the tail of the selected physical queue 110, in an embodiment.

When packets corresponding to a particular data flow are scheduled to be transmitted via the egress port 102 corresponding to the queue controller 106, the read unit 118 requests, from the corresponding logical queue read controller 120, an indication of a physical queue 110 from which a data unit 108 is to be retrieved. The logical queue read controller 120 cycles between the physical queues 110 within the corresponding logical queue 112 in the same order as was done by the logical queue write controller 116 corresponding to the logical queue 112, in an embodiment. Thus, for example, if a logical queue write controller 116 corresponding to a logical queue 112 selects physical queues 110 within the logical queue 112 in a round robin fashion for consecutively received requests from the write unit 114, then the logical queue read controller 120 corresponding to the logical queue 112 also selects physical queues in a round robin fashion among the physical queues 110 within the logical queue 112 for consecutively received requests from the read unit 118, thereby ensuring that the read order is the same as the write order for the logical queue 112. In an embodiment, upon selecting a physical queue 110 from which a data unit 108 should be retrieved, the logical queue read controller 120 provides an indication of the selected physical queue 110 to the read unit 118. The read unit 118 retrieves the data unit 108 from the indicated physical queue 110 by reading the data unit 108 from the head of the indicated physical queue, according to an embodiment. Because data unit belonging to different flows (e.g., corresponding to different priorities) are stored in different logical queues 112, the read unit 118 is able to retrieve data units 108 according to a scheduling based on the data flows (e.g., priorities) of the data units 108. For example, as illustrated in FIG. 1, the read unit 118 retrieves data units D1 and D4 from the logical queue 112*b* that corresponds to a relatively higher priority prior to retrieving data unit D0, D3, D4 and D5 from the logical queue 112*a* that corresponds to a relatively lower priority, in the illustrated embodiment.

As discussed above, because several physical queues are provided in the memory 104 for each data flow handled by the network device 100, the read unit 118 is able to concurrently retrieve and/or process several data units 108 corresponding to a particular data flow and to thereby effectively increase the rate of retrieval of data units 108, in at least some embodiments. For example, in an embodiment in which physical queues 110 are formed by respective physical linked lists, each node (buffer) in a physical queue 110 stores, along with a data unit 108, an indication (e.g., a pointer) to the next buffer in the same physical queue 110. Thus, in order to retrieve the next data unit from a particular physical queue 110, the read unit 118 has to first retrieve the data unit currently at the head of the physical queue 110, and to process the retrieved data unit to obtain the address of the next data unit in the same physical queue 110. However, data units 108 stored in a particular logical queue 112 (e.g., corresponding to a particular data flow) are actually distributed among multiple physical queues 110, and the next data unit in the same physical queue 110 is not the next data unit in the data flow corresponding to the logical queue 112. Rather, the next data unit in the same data flow is stored in a different physical queue 110 within the logical queue 112. Consequently, the indication stored with a data unit 108 in the physical queue 110 points to a data unit that does not immediately follow the current data unit 108, but is separated from the current data unit 108 by several other data unit 108 in the same data flow.

For example, in the example embodiment of FIG. 1, the indication (e.g., pointer) stored with data unit D0 in the physical queue 110*a* points to the data unit D5 in the physical queue 110*a*. However, the next data unit corresponding to the data flow 0 (D2) is stored in the physical queue 110*b* and can be retrieved from the physical queue 110*b* concurrently with retrieval of the data unit D0 from the physical queue 110*a*. Once the data unit D0 is retrieved and processed by the read unit 118, the read unit 118 obtains the indication of memory location (e.g., an address) of the data unit D5 and can then retrieve the data unit D5. As a result of defining several physical queues corresponding to a single data flow, and logically coupling the physical queues to define a single logical queue for the data flow, retrieval rate of data units from the logical queues is increased by a factor corresponding to the number of physical queues (e.g., 3), effectively increasing retrieval rate of data units stored in a logical queue (e.g., corresponding to a particular data flow) by the same factor (e.g., 3). Thus for example, in an embodiment, if it takes six clock cycles to retrieve and process a data unit 108 from a physical queue 110 and to obtain an address of the next data unit is the same logical queue, then, one data unit 108 is retrieved from a physical queue 110 every six clock cycles. On the other hand, because three data units 108 stored in a logical queue 112 can be retrieved and/or processed concurrently, in an embodiment, the queue controller 106 can output a data unit in a data flow corresponding to the logical queue 112 every two clock cycles, thereby effectively increasing the rate of retrieval by a factor of 3.

Figure 2:
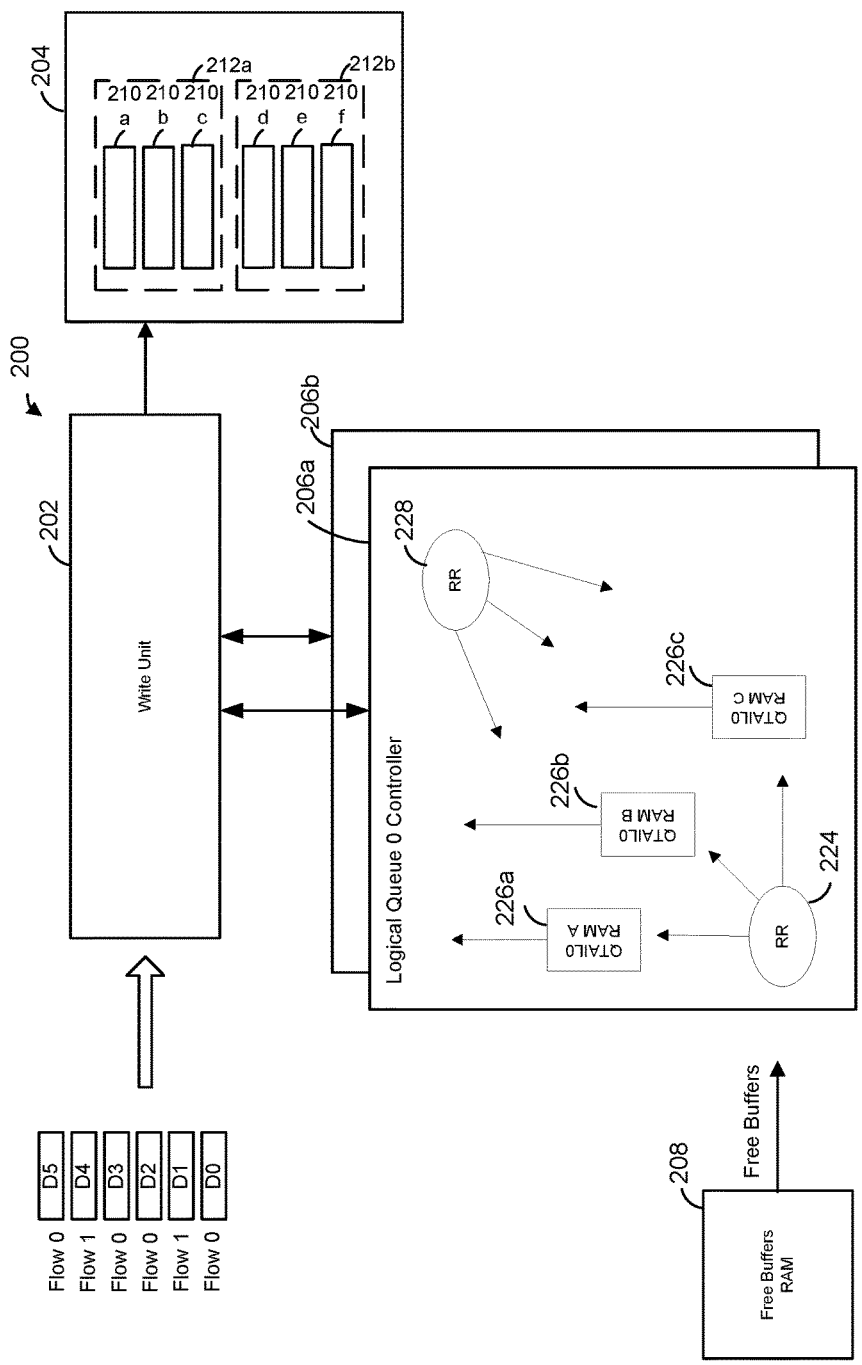
FIG. 2 is a diagram of a write portion of a queue controller included in a network device, according to another embodiment.

FIG. 2 is a diagram of write portion 200 of a queue controller such as the queue controller 106 of FIG. 1, according to an embodiment. The write portion 200 corresponds to an egress port 102 (FIG. 1) and is used to enqueue data units destined for the egress port 102, in an embodiment. The write portion 200 includes a write unit 202 coupled to a shared memory 204. Similar to the memory 104 of FIG. 1, the memory 204 includes a plurality of physical queues 210 for enqueuing packets for egress via an egress port of a network device (e.g., an egress port 102 of FIG. 1). Further, respective subsets of the physical queues 210 are logically coupled together to define a plurality of logical queues 212 corresponding to different data flows (e.g., priorities) associated with packets processed by the network device.

In the embodiment of FIG. 2, each physical queue 210 is implemented as a physical linked list that links together a sequence of buffers used for storing data units in the physical queue 210 in the memory 204. As illustrated in FIG. 1, the write unit 202 is coupled to a plurality of logical queue write controllers 206. In an embodiment, each of the logical queue write controllers 206 controls write operations for a respective logical queue 212, thereby effectively logically coupling the physical queues 210 within the corresponding logical queue 212.

With continued reference to FIG. 2, the write portion 200 also includes a free buffers memory (e.g., random access memory (RAM)) 208. In an embodiment, the free buffers memory 208 maintains a list of buffers currently available for storing data units in the memory 204, and the currently available buffers are allocated, as needed, to the logical queue write controllers 206. Each logical queue controller 206 includes a respective round robin (RR) unit 224 that distributes the free buffers allocated to the logical queue controller 206, in a round robin manner, among the physical queues 210 within the logical queue governed by the logical queue controller 206, in an embodiment.

For clarity and ease of explanation, operation of the logical queue write controllers 206 is described below with reference to the logical queue 212 and the corresponding logical queue write controller 206a. The logical queue write controller 206 includes a set of queue tail memories (e.g., random access memories (RAMs), register based memories, etc.) 226a-226c. In an embodiment, each of the queue tail memories 226a-226c corresponds, respectively, to each of the physical queues 210a-210c in the logical queue 112a. Each queue tail memory 226 holds an indication (e.g., an address) of a next tail buffer in the corresponding physical queue 110, i.e. an indication of a buffer that will hold a data unit next to be stored in the corresponding physical queue 110. In an embodiment, the RR unit 224 populates the queue tail memories 226 (e.g., in a round robin fashion), as needed, with free buffers allocated to the logical queue controller 206a.

In operation, when the write unit 202 receives a data unit to be stored in the logical queue 112a, the write unit 202 sends a request for a next tail buffer to the logical queue controller 226a. A RR unit 228 receives the request, selects a physical queue 110 from the set of physical queues 110a-110c corresponding to the logical 112a, and provides the indication stored in the corresponding queue tail memory 226 to the write unit 202. The write unit 202 writes the data unit to the current tail buffer of the selected physical queue 110 along with the indicator (e.g., address) of the next tail buffer in the physical queue 110 provided by the RR unit 224, thereby linking the next tail buffer in the physical queue 110 to the current tail buffer in the selected physical queues 110. Further, the queue tail memory 226 that corresponds to the selected physical queue is updated with an indication of the new tail buffer in the physical queue, in an embodiment.

Subsequently, the write unit 202 receives a next data unit to be stored in the logical queue 212a and sends a request for a next tail buffer to be stored with the received next data unit 108 to the queue controller 206a. In response to receiving the request from the write unit 202, the RR unit 228 selects a next physical queue 210 within the logical queue 212a (e.g., the physical queue 210b) and provides a buffer indicator (e.g., an address) stored in the queue tail memory corresponding to the selected next physical queue 210 (e.g., queue tail memory 226b). The write unit 202 writes the data unit to the current tail buffer of the selected physical queue (e.g., 210b) along with the indicator of the next tail buffer in the selected next physical queue 210b provided by the RR unit 224, thereby linking the next tail buffer in the physical queue 210b to the current tail buffer in the selected physical queues 210b. The process of selecting a next physical queue for each received request from the write unit 202 repeats until the RR unit 224 selects the last physical queue (the physical queue 210c in the example embodiment of FIG. 2). After selecting the last physical queue 210c, the RR unit 224 cycles back and selects the first physical queue 210a for the next request received from the write unit 202, and then selects the second physical queue 110b for the following request from the write unit 202, and so on, in an embodiment.

Figure 3:
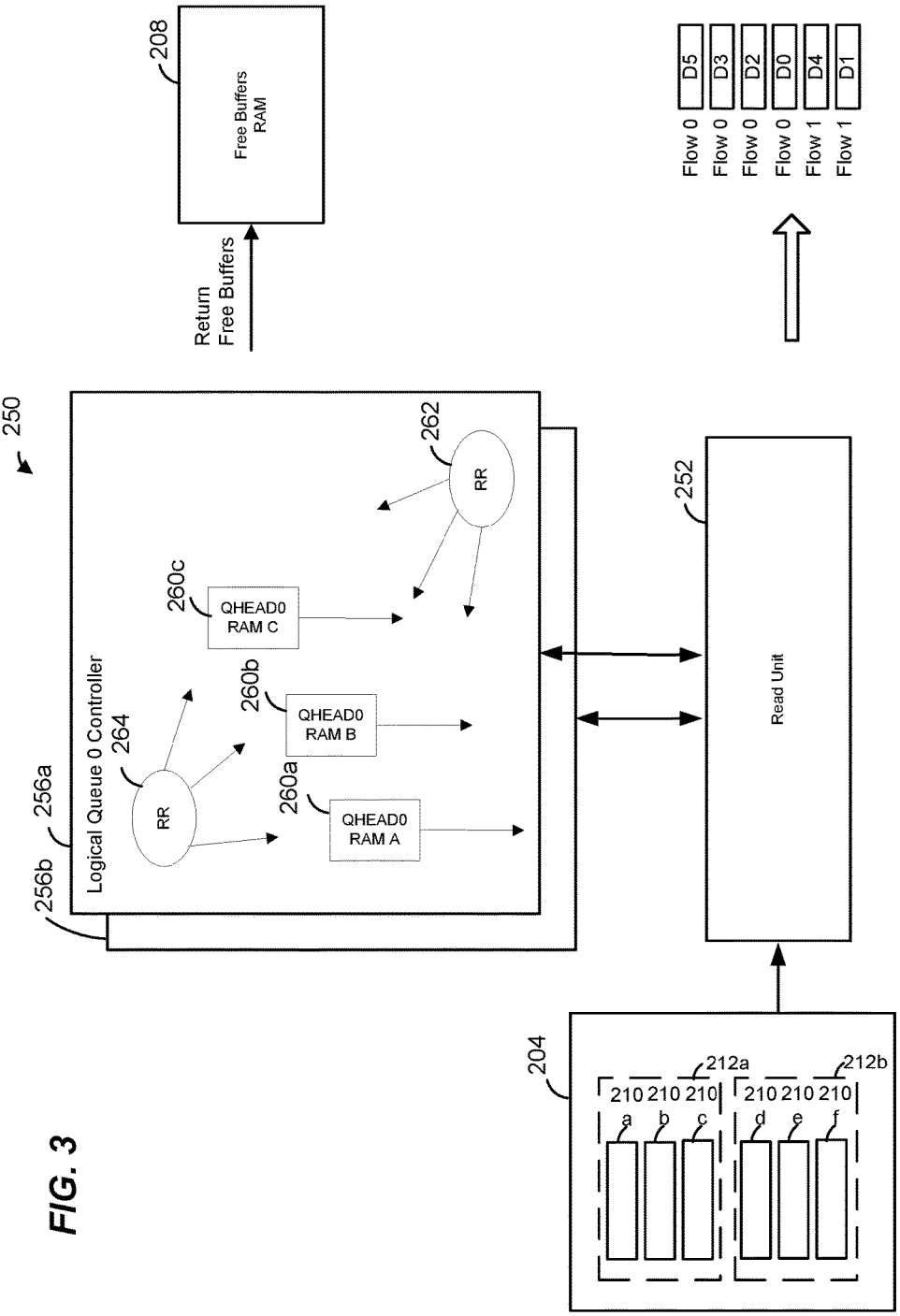
FIG. 3 is a diagram of a read portion of a queue controller included in a network device, according to another embodiment.

FIG. 3 is a diagram of a read portion 250 of a queue controller such as the queue controller 106 of FIG. 1, according to an embodiment. The read portion 250 is used in conjunction with the write portion 200 of FIG. 2 and is configured to control read operations from the memory 204 of FIG. 2. The read portion 250 includes a read unit 252 coupled to the memory 204 and to a plurality of logical queue read controllers 256. Similar to the write queue controllers 206 of FIG. 2, each queue controller 256 includes a set of queue head memories (e.g., RAMs, register based memories, etc.) 260, with each head queue memory 260 corresponding to a particular physical queue in the corresponding logical queue. In an embodiment, each queue memory 206 stores an indication (e.g., an address) of a buffer currently at the head of the corresponding physical queue. In an embodiment, each queue controller 256 includes a respective RR unit 262 that selects a physical queue 210 within a corresponding logical queue 112 when a data unit is to be retrieved from the logical queue 112. Each queue controller 256 also includes a respective queue memory update RR unit 264 responsible for updating the queue head memories 260 with new indications of head buffers in the corresponding physical queues when data units are retrieved from the physical queues, in an embodiment.

In some embodiments, the read unit 252 is configured to retrieve data units enqueued in the memory 204 according to a certain scheduling based, for example, on priorities of the data flows supported by the read unit 252. For example, data units are scheduled to be de-queued from the logical queues 212 according to a strict priority queuing scheme, in an embodiment. In another embodiment, data units are scheduled to be de-queued from the logical queues 212 according to a weighting scheme, such as a weighted fair priority queuing scheme, for example, in which data units are retrieved more often from a logical queue that corresponds to a higher priority than from a lower priority logical queue 212. In any event, when the read unit 252 is to retrieve a data unit from a particular logical queue 212, the read unit 252 requests an indication of a physical queue from which the data unit is to from a corresponding logical queue read controller 256. For example, to retrieve a data unit from the logical queue 112a, the read unit 252 requests an indication of a physical queue from which the data unit should be retrieved from the logical queue read controller 256a. In response to receiving the request, a RR unit 262 selects a physical queue 210 within the logical queue 212a, and retrieves an indication (e.g., an address) of the head buffer of the selected physical queue from the corresponding queue head memory 260. The RR unit 262 selects physical queues within the logical queue 212a in the same manner that the RR unit 228 in the write portion 200 of FIG. 2 selects physical queues to which data units are written, thereby preserving the order of the data units written to the physical queue 112a as the data units are retrieved from the logical queue 112a, according to an embodiment.

The indication (e.g., address) of the head buffer is then provided to the read unit 252, according to an embodiment. The read unit 252 receives the indication, retrieves the data unit stored at the indicated location in the memory 204 and processes the data unit to obtain an indication (e.g., and address) of the next buffer in the same physical queue. In at least some situations, during retrieval and/processing of a first data unit from a first physical queue (e.g., 210a), the read unit 252 obtains an indication of a head buffer in a second physical queue (e.g. 210b), and retrieves a second data unit from the second physical queue concurrently with the retrieval and/or processing of the first data unit from the first physical queue. As a result, providing several physical queues to serve an egress port of a network device effectively increases the rate of de-queuing data units enqueued for egress via the network port, of thereby increasing the bandwidth of the network port, in at least some embodiments and/or scenarios. Further, because subsets of physical queues are logically coupled (e.g., via respective logical queue controllers 226, 260) to define logical queues corresponding to data flow, the read unit 252 is able to de-queue the data units according to a scheduling based on the different data flows. Thus, for example, at least some data units that belong to a data flow associated with a higher priority can be retrieved prior to retrieval of data units that belong to a data flow associated with a relatively lower priority, in an embodiment.

According to an embodiment, when a data unit has been retrieved from the corresponding physical queue, and the address of the new head buffer (i.e., the next buffer in the physical queue) has been obtained by the read unit 252, the RR unit 264 of the corresponding logical queue read controller 256 updates the corresponding queue memory 260 with the new indication of the head buffer in the physical queue. Further, the read unit 252 returns the buffer from which the data unit was retrieved to the free buffers memory 208, thereby releasing the buffers so that buffer can be subsequently allocated for other data units to be stored in the memory 204, in an embodiment.

Figure 4:
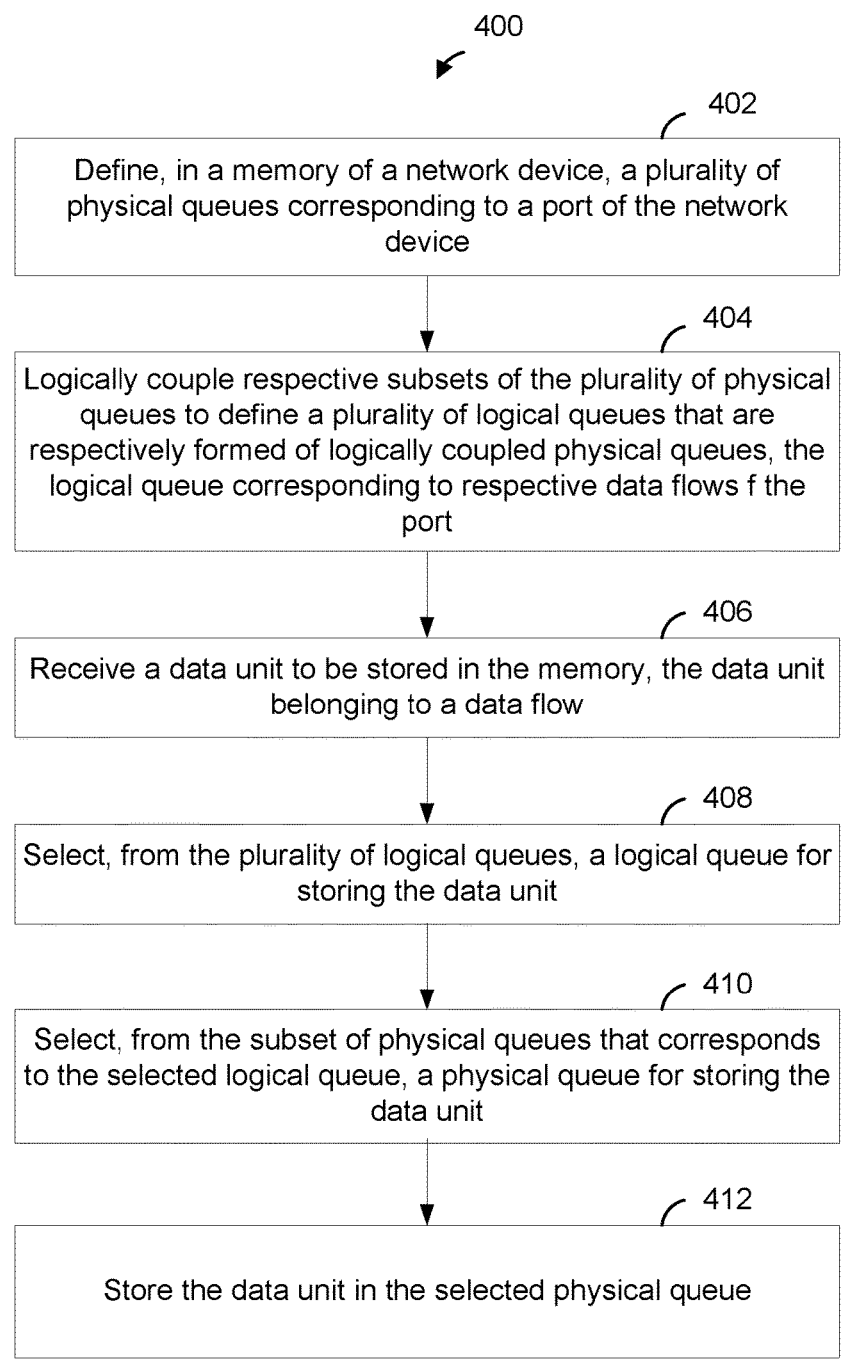
FIG. 4 is a flow diagram of an example method for queuing data units in a network device, according to an embodiment.

FIG. 4 is a flow diagram of an example method 400 for queuing data units in a network device, according to an embodiment. In an embodiment, the method 400 is implemented by the network device 100 of FIG. 1. For example, referring to FIG. 1, the method 400 is implemented at least partially by the queue controller unit 106 in, in an embodiment. In an embodiment, the method 400 is implemented at least partially by the queue controller 200 of FIG. 2. In other embodiments, the method 400 is implements by other suitable network devices.

At block 402, a plurality of physical queues are defined in the memory of the network device. Referring to FIG. 1, in an embodiment, the plurality of physical queues 110 is defined. In another embodiment, other suitable physical queues are defined. In an embodiment, each physical queue in the plurality of physical queues is formed by sequences of physically coupled memory cells in the memory of the network device. In another embodiment, each physical queue in the plurality physical queues is formed by a physical linked list in which buffers in the memory are allocated, as needed, for a physical queue, and the buffers are linked together via a linked list in the memory by including, in each buffer in a physical queue, a link (e.g., a pointer) to the next buffer in the physical queue.

At block 404, respective subsets of the physical queues defined at block 402 are logically coupled together to define a plurality of logical queues that are respectively formed of logically coupled physical queues. Referring to FIG. 1, the plurality of logical queues 112 is defined. In another embodiment, the logical queues are defined in another suitable manner. In an embodiment, the logical queues defined at block 404 correspond to respective data flows of the port of the network device.

At block 406, a data unit to be stored in the memory is received. Referring to FIG. 1, a data unit 108 is received, in an embodiment. In another embodiment, another suitable data unit is received. In an embodiment, the received data unit belongs to a particular data flow of the port of the network device.

At block 408, a logical queue for storing the data unit received at block 406 is selected from the plurality of logical queues defined at block 404. In an embodiment, the logical queue for storing the data unit is selected based on the data flow corresponding to the data unit. At block 410, a physical queue is selected from the subset of physical queues. In an embodiment, physical queues are selected in a round robin manner for consecutively received data units to be stored in the logical queue. In another embodiment, physical queues are selected according to other suitable selection schemes. At block 412, the data unit received at block 406 is stored in the memory in the physical queue selected at block 410.

At least some of the various blocks, operations, and techniques described above may be implemented utilizing hardware, a processor executing firmware instructions, a processor executing software instructions, or any combination thereof. For example, at least some of the various blocks, operations, and techniques described above may be implemented in a custom integrated circuit (IC), an application specific IC (ASIC), a programmable logic device, etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
logically coupling a plurality of physical queues, respective physical queues among the plurality of physical queues having respective concurrently accessible memory spaces in a memory of a network device, to define a logical queue;
receiving packets at the network device;
distributing respective data units associated with the packets to the plurality of physical queues for storage according to a predetermined scheme i) to alternate among the plurality of physical queues, and ii) to maintain an order of the data units stored in the logical queue;
retrieving the data units from the plurality of physical queues according to the predetermined scheme i) to alternate among the plurality of physical queues, and ii) to maintain the order of the data units, including concurrently retrieving at least two of the data units associated with at least two of the packets from at least two physical queues among the plurality of physical queues.

2. The method of claim 1, wherein:
the packets belong to a first data flow;
the method further comprising selecting the logical queue from a plurality of logical queues based on the first data flow to which the packets belong; and
the plurality of logical queues correspond to respective data flows.

3. The method of claim 2, wherein:
the packets are first packets;
the data units are first data units;
the logical queue is a first logical queue;
the plurality of physical queues is a plurality of first physical queues;
the method further comprising:
logically coupling a plurality of second physical queues, in the memory of the network device, to define a second logical queue,
receiving second packets at the network device, the second packets belonging to a second data flow,
selecting the second logical queue from the plurality of logical queues based on the second data flow to which the second packets belong,
distributing respective second data units associated with the second packets to the plurality of second physical queues for storage according to the predetermined scheme i) to alternate among the plurality of second physical queues, and ii) to maintain an order of the second data units stored in the second logical queue, and
retrieving the second data units from the plurality of second physical queues according to the predetermined scheme i) to alternate among the plurality of second physical queues, and ii) to maintain the order of the second data units.

4. The method of claim 1, wherein distributing respective data units to the plurality of physical queues for storage according to the predetermined scheme comprises distributing respective data units to the plurality of physical queues for storage according to a round robin scheme.

5. The method of claim 1, further comprising:
storing at least two data units associated with at least two of the packets to at least two physical queues among the plurality of physical queues concurrently.

6. The method of claim 1, wherein:
the network device includes a packet processor for processing packets received by the network device; and
distributing respective data units comprises distributing data units received from the packet processor after completion of ingress processing of the data units by the packet processor.

7. The method of claim 1, further comprising:
defining the plurality of physical queues in the memory.

8. The method of claim 7, wherein defining the plurality of physical queues comprises forming a physical queue in the plurality physical queues as a linked list of buffers.

9. The method of claim 1, distributing respective data units associated with the packets to the plurality of physical queues for storage comprises distributing respective packet descriptors associated with the packets to the plurality of physical queues for storage.

10. The method of claim 1, further comprising
allocating, to the logical queue, free buffers that have memory space available for storage; and
distributing the free buffers, allocated to the logical queue, among the plurality of physical queues according to a predetermined arbitration scheme.

11. The method of claim 10, wherein distributing the free buffers among the plurality of physical queues comprises:
distributing the free buffers among the plurality of physical queues according to a predetermined arbitration scheme that determines an order in which free buffers are provided to the plurality of physical queues.

12. The method of claim 10, further comprising:
releasing buffers that were used to store the data units retrieved from the plurality of physical queues to a set of free buffers;
wherein allocating free buffers to the logical queue comprises allocating buffers among the set of free buffers to the logical queue.

13. The method of claim 1, wherein logically coupling the plurality of physical queues to define the logical queue comprises forming a logical linked list defining a linking between respective buffers of different ones of the plurality of physical queues.

14. An apparatus for queuing data units in a network device, the apparatus comprising:
a memory having a plurality of physical queues, respective physical queues among the plurality of physical queues having respective concurrently accessible memory spaces in the memory; and
a queue controller configured to:
logically couple the plurality of physical queues to define a logical queue,
receive data units to be stored in the memory, the data units respectively associated with packets received by the network device,
distribute the data units to the plurality of physical queues for storage according to a predetermined scheme i) to alternate among the plurality of physical queues, and ii) to maintain an order of the data units stored in the logical queue,
retrieve the data units from the plurality of physical queues according to the predetermined scheme i) to alternate among the plurality of physical queues, and ii) to maintain the order of the data units, the queue controller being configured to concurrently retrieve at least two of the data units associated with at least two of the packets from at least two physical queues among the plurality of physical queues.

15. The apparatus of claim 14, wherein the logical queue corresponding to a network port of the network device.

16. The apparatus of claim 15, wherein the network port of the network device is an egress network port, and wherein the apparatus is included in an egress processing unit of the network device.

17. The apparatus of claim 14, wherein:
the packets belong to a first data flow;
the queue controller is configured to select the logical queue from a plurality of logical queues based on the first data flow to which the packets belong; and
the plurality of logical queues correspond to respective data flows.

18. The apparatus of claim 17, wherein:
the packets are first packets;
the data units are first data units;
the logical queue is a first logical queue;
the plurality of physical queues is a plurality of first physical queues;
the memory includes a plurality of second physical queues; and
the queue controller is configured to:
logically couple a plurality of second physical queues, in the memory of the network device, to define a second logical queue,
receive second data units to be stored in the memory, the second data units respectively associated with second packets received by the network device, the second data units belonging to a second data flow,
select the second logical queue from the plurality of logical queues based on the second data flow to which the second packets belong,
distribute respective second data units associated with the second packets to the plurality of second physical queues for storage according to the predetermined scheme i) to alternate among the plurality of second physical queues, and ii) to maintain an order of the second data units stored in the second logical queue, and
retrieve the second data units from the plurality of second physical queues according to the predetermined scheme i) to alternate among the plurality of second physical queues, and ii) to maintain the order of the second data units.

19. The apparatus of claim 14, wherein the queue controller is configured to distribute respective data units to the plurality of physical queues for storage according to a round robin scheme.

20. The apparatus of claim 14, wherein the queue controller is configured to:
store at least two data units associated with at least two of the packets to at least two physical queues among the plurality of physical queues concurrently.

21. The apparatus of claim 14, further comprising:
a packet processor for processing packets received by the network device;
wherein the queue controller is configured to distribute respective data units received from the packet processor after completion of ingress processing of the data units by the packet processor.

22. The apparatus of claim 13, wherein the queue controller is configured to:
define the plurality of physical queues in the memory.

23. The apparatus of claim 13, wherein the queue controller is configured to form a physical queue in the plurality physical queues as a linked list of buffers.

24. The apparatus of claim 13, wherein:
the data units are packet descriptors associated with the packets; and
the queue controller is configured to distribute respective packet descriptors associated with the packets to the plurality of physical queues for storage.

25. The apparatus of claim 14, wherein the queue controller is further configured to
allocate, to the logical queue, free buffers that have memory space available for storage, and
distribute the free buffers, allocated to the logical queue, among the plurality of physical queues, according to a predetermined arbitration scheme.

26. The apparatus of claim 25, wherein the queue controller is configured to:
distribute the free buffers among the plurality of physical queues according to a predetermined arbitration scheme that determines an order in which free buffers are provided to the plurality of physical queues.

27. The apparatus of claim 25, wherein the queue controller is configured to:
release buffers that were used to store the data units retrieved from the plurality of physical queues to a set of free buffers; and
allocate buffers among the set of free buffers to the logical queue.

28. The apparatus of claim 14, wherein the queue controller is configured to logically couple the plurality of physical queues to define the logical queue at least by forming a logical linked list defining a linking between respective buffers of different ones of the plurality of physical queues.

* * * * *